United States Patent

Kasai

(10) Patent No.: US 8,157,232 B2
(45) Date of Patent: Apr. 17, 2012

(54) DISPLAY PANEL DRIVING MECHANISM FOR ELECTRONIC DEVICE

(75) Inventor: Keiji Kasai, Sagamihara (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 0 days.

(21) Appl. No.: 13/190,612

(22) Filed: Jul. 26, 2011

(65) Prior Publication Data

US 2011/0278413 A1    Nov. 17, 2011

Related U.S. Application Data

(62) Division of application No. 11/666,101, filed as application No. PCT/JP2005/012976 on Jul. 7, 2005.

(30) Foreign Application Priority Data

Oct. 29, 2004    (JP) .................................. 2004-315204

(51) Int. Cl.
*E04G 3/00*    (2006.01)
(52) U.S. Cl. ..................... 248/284.1; 248/371; 248/918; 361/679.01
(58) Field of Classification Search ............... 248/291.1, 248/292.13, 292.14, 295.11, 286.1, 917, 248/918, 27.1, 288.11, 274.1, 284.1, 371; 348/787, 789, 836, 794; 361/725, 727, 679.01; 16/346, 357, 360, 361, 368, 369, 370, 362, 16/344; 312/24, 26, 30, 300
See application file for complete search history.

(56) References Cited

U.S. PATENT DOCUMENTS

| 4,817,240 A | 4/1989 | Sovis et al. |
| 6,241,300 B1 | 6/2001 | Suzuki |
| 6,752,363 B2 | 6/2004 | Boele |
| 6,809,920 B2 | 10/2004 | Muroga et al. |
| 6,886,701 B2 | 5/2005 | Hong et al. |
| 6,923,413 B2 | 8/2005 | Dozier |

FOREIGN PATENT DOCUMENTS

| DE | 102 91 707 | 4/2004 |
| DE | 699 11 542 | 7/2004 |
| EP | 0 995 635 | 4/2000 |
| JP | 05-105003 | 4/1993 |
| JP | 07-285390 | 10/1995 |

(Continued)

OTHER PUBLICATIONS

International Search Report (Application No, PCT/JP2005/012976) dated Oct. 18, 2005.

(Continued)

*Primary Examiner* — Terrell McKinnon
*Assistant Examiner* — Eret McNichols
(74) *Attorney, Agent, or Firm* — Eric J. Robinson; Robinson Intellectual Property Law Office, P.C.

(57) ABSTRACT

A display panel driving mechanism for electronic device supports a lower side of a display panel (1), which is arranged on a front plane of an electronic device, to be freely turned around a first shaft (5*a*) which moves by following a slider (4) driven in to and fro directions. The mechanism shifts a second shaft (9*a*), which is provided on a member (9) attached on an upper side of the display panel (1), along a guide groove (2*a*) provided on a member (2) fixed to a case.

2 Claims, 4 Drawing Sheets

FOREIGN PATENT DOCUMENTS

| | | |
|---|---|---|
| JP | 2000-132956 | 5/2000 |
| JP | 2002-154382 | 5/2002 |
| JP | 2002-316556 | 10/2002 |
| JP | 2003-069920 | 3/2003 |
| WO | WO 02/087299 | 10/2002 |

OTHER PUBLICATIONS

International Preliminary Examination Report (Application No. PCT/JP2005/012976) dated May 10, 2007.
Office Action (JP 2004-315204) dated Jan. 9, 2009.
Office Action (JP 2004-315204) dated Mar. 11, 2009.

DISPLAY PANEL DRIVING MECHANISM FOR ELECTRONIC DEVICE

TECHNICAL FIELD

The present invention relates to a display panel driving mechanism for an electronic device, and in particular, relates to a display panel driving mechanism suitable for a vehicle-mounted electronic device.

BACKGROUND ART

An example of a conventional display panel driving mechanism for a vehicle-mounted electronic device will be described with reference to FIG. 4. A chassis, which is not illustrated, and a subpanel 2 are fixed to a case 3 of a vehicle-mounted electronic device illustrated in FIG. 4, and the case 3 of the vehicle-mounted electronic device is attached to a vehicle so that a front plane of the subpanel 2 may abut on a cluster panel 7 of the vehicle.

A slider 12 driven by a driving mechanism which is not illustrated is attached to the chassis movably in to and fro directions (left and right directions to the figure). A lower portion of the display panel 1 is rotatably supported by a shaft 12a installed in a standing manner in the slider 12, and a shaft 1a fixed to an upper portion of the display panel 1 is engaged with a guide groove 2a provided in the subpanel 2.

A display unit 8, such as an LCD, is attached to the display panel 1. When the slider 12 is driven forward, the shaft 12a moves forward with the slider 12, and the lower portion of the display panel 1 moves forward (left direction to the figure). Then, the shaft 1a of the upper portion of the display panel 1 is guided by the guide groove 2a to move downward.

That is, the display panel 1 inclines so that its lower portion may protrude, and releases a recording medium insert port provided in the subpanel 2 to enable to load and unload a recording medium. Since a front plane of the display unit 8 faces upward in this status, crew can see the display unit 8, and can use the vehicle-mounted electronic device.

In the conventional display panel driving mechanism described above, it is driven so that the lower portion of the display panel 1 may protrude, and it is inclined so that the front plane of the display panel 1 may face upward. However, it is not inclined so that the front plane of the display panel 1 may face downward. When a vehicle-mounted electronic device is arranged horizontally in crew's front lower part, a display plane of the display panel 1 becomes easy-to-see by its inclining so that the front plane may face upward, but the vehicle-mounted electronic device is not necessarily attached to a vehicle in such a position and a posture.

For example, there are a case that a vehicle-mounted electronic device is attached above crew's eye level, and a case that a vehicle-mounted electronic device is attached in inclination. In these cases, it is required to make the display plane of the display panel 1 be in an easy-to-see posture, or to incline the front plane of the display panel 1 downward so as to avoid reflection of sunlight.

In the conventional display panel driving mechanism, a lower end plane 1b of the display panel 1 interferes with a lower corner 2b of an aperture portion of the subpanel 2 when the front plane of the display panel 1 is declined so as to face downward by moving the slider 12 backward in a status illustrated in FIG. 4. In addition, in some having a narrow aperture portion of the cluster panel 7, there is a possibility of stacking owing to the lower end plane 1b of the display panel 1 interfering with the cluster panel 7.

Although a vehicle-mounted electronic device accommodation box proposed in Japanese Patent Application Laid-Open No. 7-285390 has construction of rotating a front plane of a panel so as to face downward, a lower plane of the panel is formed in a circular arc shape with centering a rotating shaft so that the panel may not interfere with the aperture portion of a body case when the panel rotates. For this reason, there were issues that the display plane of the panel could not be enlarged, and that a space opened in the down side of the panel to be not good-looking.

DISCLOSURE OF THE INVENTION

The present invention is made in view of such respects, and aims at providing a display panel driving mechanism for an electronic device which can enlarge sizes of a display plane of a display panel, can incline a front plane of a display panel 1 so as to face downward without providing a large space below the display panel, and can prevent securely interference with a cluster panel of the vehicle and the like when the display panel is driven.

A display panel driving mechanism for an electronic device according to this invention is a display panel driving mechanism for an electronic device which supports a lower side of a display panel, which is arranged on a front plane of the electronic device, rotatably around a first shaft which moves by following a slider driven in to and fro directions. The mechanism shifts a second shaft, which is directly installed in a standing manner on an upper side of the display panel or is provided on a member attached on the upper side of the display panel, along a guide groove provided on a member fixed to a case. It is constructed such that the first shaft is shifted backward and upward in a shifting initial period of the first shaft when the first shaft is shifted backward from an initial status, in which the display panel is at a position where it covers the front plane of the electronic device by not inclining, and the front plane of the display panel is inclined downward.

In addition, in the display panel driving mechanism for an electronic device, the member attached on an upper side of the display panel is a lever which is rotatably supported by the display panel. A rotation range of the lever to the display panel is restricted by a part of the lever abutting on the display panel. A second shaft is installed in a standing manner in the lever.

In addition, in the display panel driving mechanism for each electronic device, the slider and the first shaft are movable also in a forward direction from an initial status in which the display panel is at a position where it covers the front plane of the electronic device by not inclining. Hence, this enables to move the slider forward to make the display panel incline so that a front plane may face upward.

Furthermore, in the display panel driving mechanism for each electronic device, the first shaft is installed in a standing manner in an arm which is rotatably supported by the slider. It is constructed so that a cam follower provided in the arm may slidably contact with a cam fixed to the case.

Moreover, in the display panel driving mechanism for an electronic device, the cam follower is energized in a direction of press-contacting with the cam by a spring around the shaft where the arm is supported rotatably. A stopper which restricts rotation of the lever when the cam follower separates from the cam in connection with forward movement of the slider is provided in the slider.

In addition, in the display panel driving mechanism for an electronic device described above, while a subslider is supported by the slider, the first shaft is installed in a standing manner in the subslider. The above-mentioned subslider is constructed so as to be shifted to the slider so as to shift the first shaft backward and upward from an initial status in which the display panel is at a position where it covers the front plane of the electronic device by not inclining.

According to the display panel driving mechanism of this invention, since a front plane of a display panel can be inclined so as to face downward, a display plane can be made into an easy-to-see posture regardless of an attached location and a posture of a vehicle-mounted electronic device. Moreover, sizes of the display plane of the display panel can be increased without providing a large space in the lower side of the display panel, which gives it good appearance.

Furthermore, even when an aperture portion of a cluster panel is narrow, interference with the cluster panel of a vehicle and the like is surely prevented when the display panel is driven.

BEST MODES FOR CARRYING OUT THE INVENTION

Figure 1:
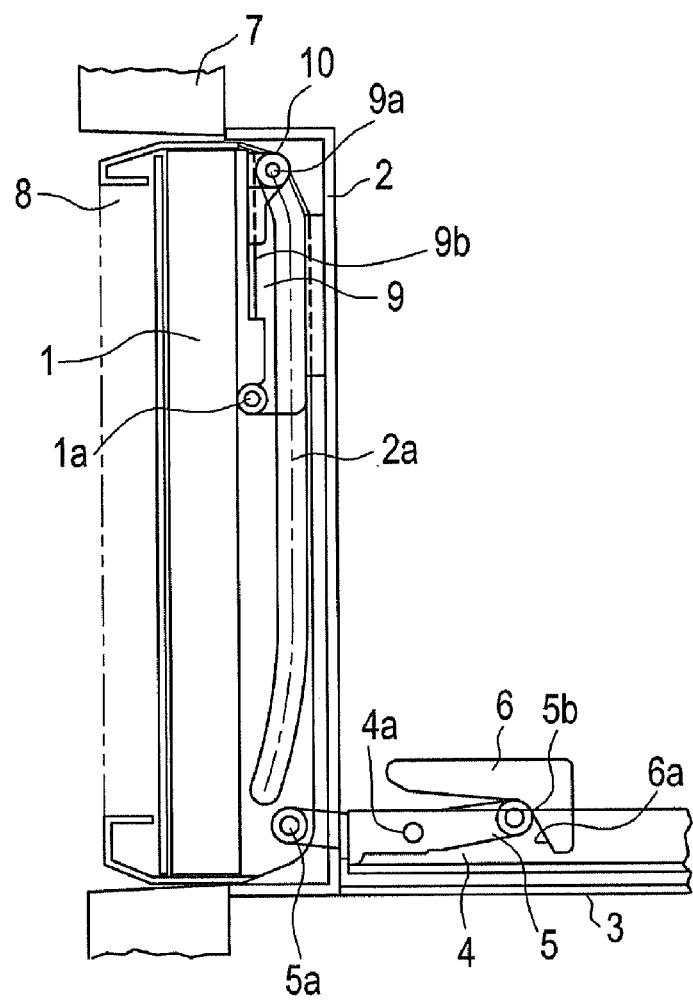
FIG. 1 is a partial side view illustrating a display panel driving mechanism for an electronic device, which is a first embodiment of this invention, with seeing through some members.

Best modes for carrying out this invention will be described below on the basis of embodiments.
Embodiment 1
FIG. 1 is a partial side view illustrating a display panel driving mechanism for an electronic device, which is a first embodiment of the present invention, with seeing through some members. A chassis, which is not illustrated, and a subpanel 2 are fixed to a case 3 of a vehicle-mounted electronic device illustrated in FIG. 1, and the case 3 of the vehicle-mounted electronic device is attached to a vehicle so that a front plane of the subpanel 2 may abut on a cluster panel 7 of the vehicle.

A slider 4 is attached to the chassis movably in to and fro directions (left and right directions to the figure). The slider 4 is driven in to and fro directions by a driving mechanism which is not illustrated. An arm rotation center shaft 4a installed in a standing manner in the slider 4 supports an arm 5 rotatably.

A first shaft 5a installed in a standing manner in one side of the arm 5 supports a lower portion of the display panel 1 rotatably. A roller 5b rotatably supported by a shaft installed in a standing manner in the other side of the arm 5 is press-contacted with a cam 6a provided in a roller guide 6 fixed to the chassis.

That is, the arm 5 is counterclockwise energized by a spring which is not illustrated. A stopper which restricts rotation of the arm 5 when the roller 5b separates from the cam 6a, and which is not illustrated is provided in the slider 4.

A lever 9 is rotatably supported by the shaft 1a installed in a standing manner in the display panel 1. A second shaft 9a installed in a standing manner in the lever 9 supports the roller 10 rotatably. The roller 10 is engaged into the guide groove 2a provided in the subpanel 2. Since a folded piece 9b of the lever 9 is enabled to abut on the display panel 1, a rotation range of the lever 9 to the display panel 1 is restricted.

The slider 4, the guide grooves 2a, the arms 5, the levers 9, and the first shafts 9a are provided in both side portions of the display panel 1 symmetrically. In addition, the sliders 4 in both sides have integral construction. The display unit 8, such as an LCD, is attached to the display panel 1.

Figure 2:
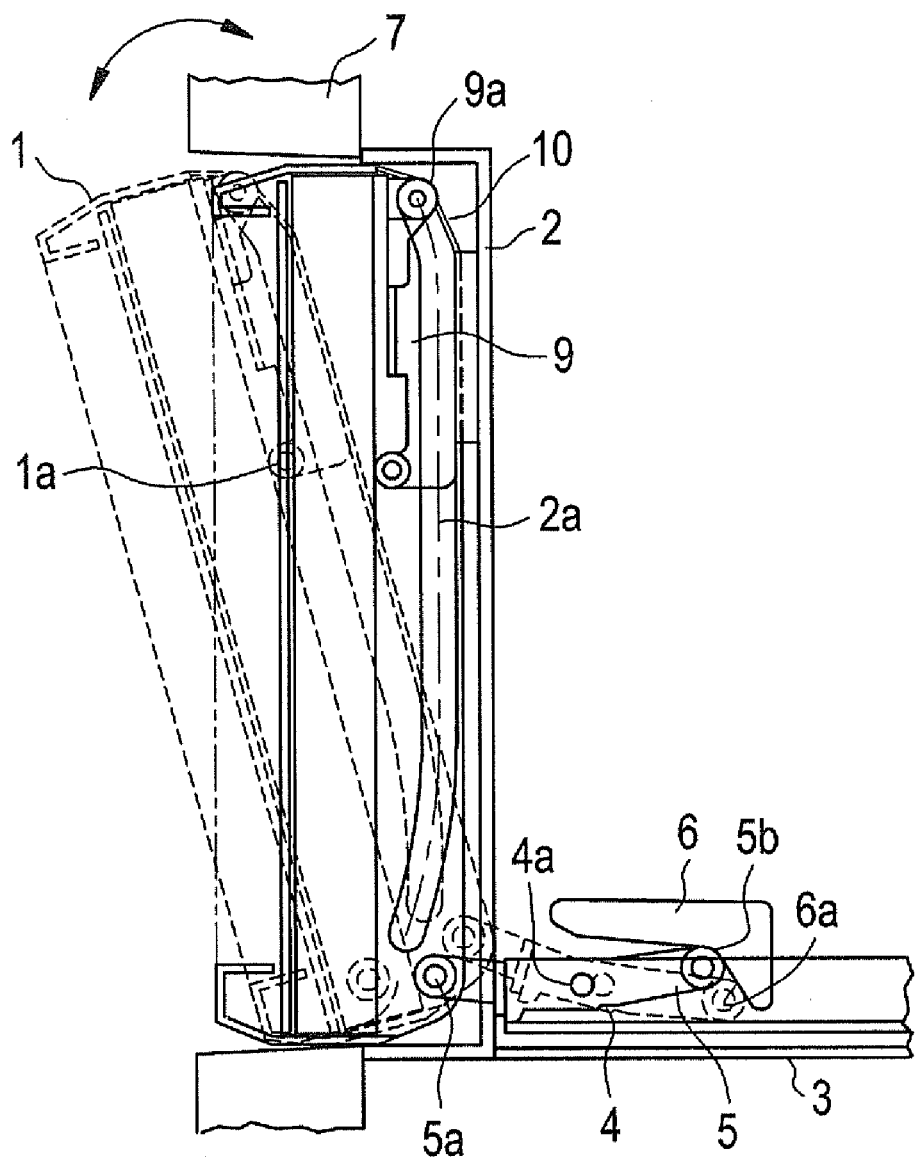
FIG. 2 is a partial side view illustrating member movement loci at the time of a display panel drive operation of this display panel driving mechanism in the display panel driving mechanism.

An action of the display panel driving mechanism with the construction will be described. A slider 4 is driven forward and backward with a position, illustrated in FIG. 1, as an initial status. FIG. 2 illustrates loci of the display panel 1 at the time of the slider 4 being driven to the rear from the position illustrated in FIG. 1.

As shown in FIG. 2, although the roller 5b moves backward with backward movement of the slider 4, the roller 5b is press-contacted with the cam 6a, and hence, the first shaft 5a moves upward with the backward movement of the slider 4 while moving backward. Although an upward force acts on the display panel 1 at this time, the second shaft 9a is located in an upper edge of the guide groove 2a, and does not move.

Then, the display panel 1 rotates around the shaft 1a. Then, the lever 9 rotates clockwise with the second shaft 9a as a rotation center. The front plane of the display panel 1 can be inclined downward by such movement. At this time, since the first shaft 5a moves upward while moving backward, it is prevented that a lower end plane of the display panel approaches the cluster panel 7, or is stacked by interfering with the cluster panel 7.

When the slider 4 is driven forward from the position illustrated in FIG. 1, the first shaft 5a moves downward with the forward movement of the slider 4 while moving forward. Hence, it is prevented that a top portion of the display panel approaches the cluster panel 7, or is stacked by interfering with the cluster panel 7. When the slider 4 advances further even after the roller 5b and the cam 6a separate, the arm 5 abuts on the stopper of the slider, and rotation is stopped.

When the lower portion of the display panel 1 moves forward greatly, the folded piece 9b of the lever 9 abuts on the display panel 1, and the lever 9 moves integrally with the display panel 1. Then, the second shaft 9a installed in a standing manner in the lever 9 is guided by the guide groove 2a to move downward greatly. The display panel 1 inclined in this manner releases the recording medium insert port provided in the subpanel 2 to enable to load and unload a recording medium.

Figure 3:
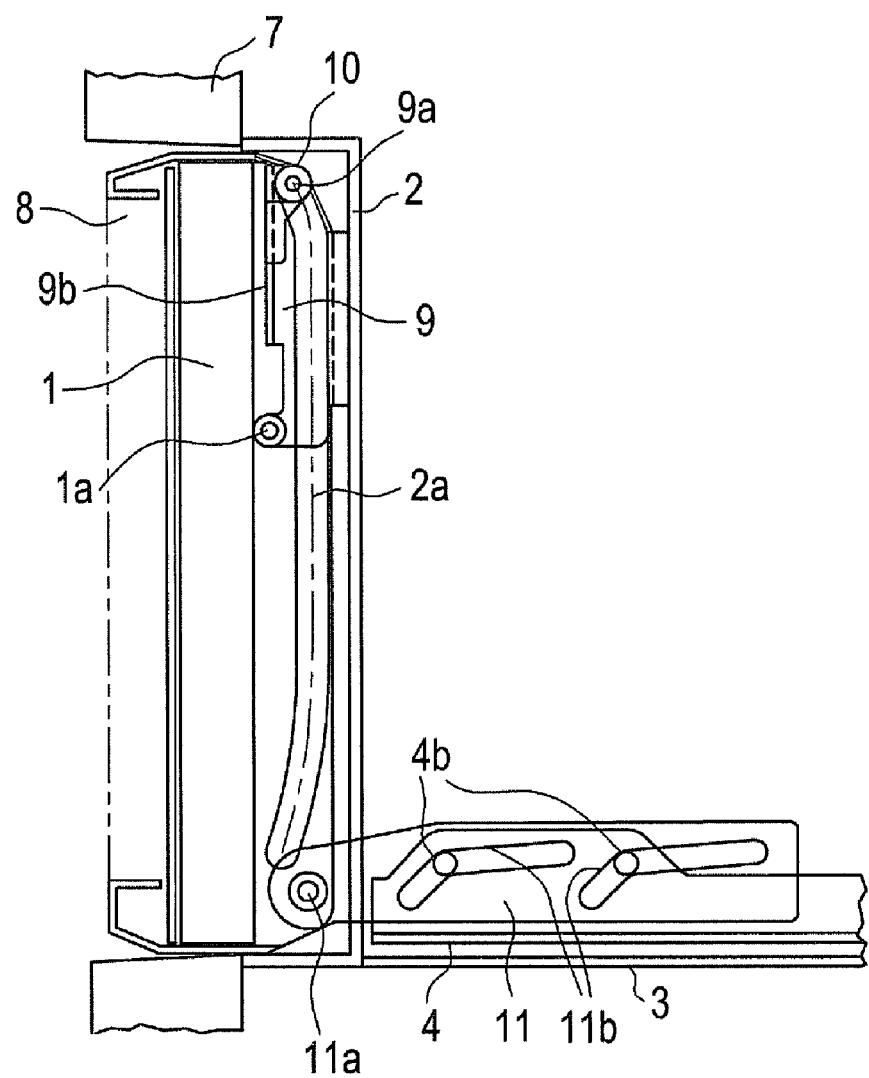
FIG. 3 is a partial side view illustrating a display panel driving mechanism for an electronic device, which is a second embodiment of the present invention, with seeing through some members.
Figure 4:
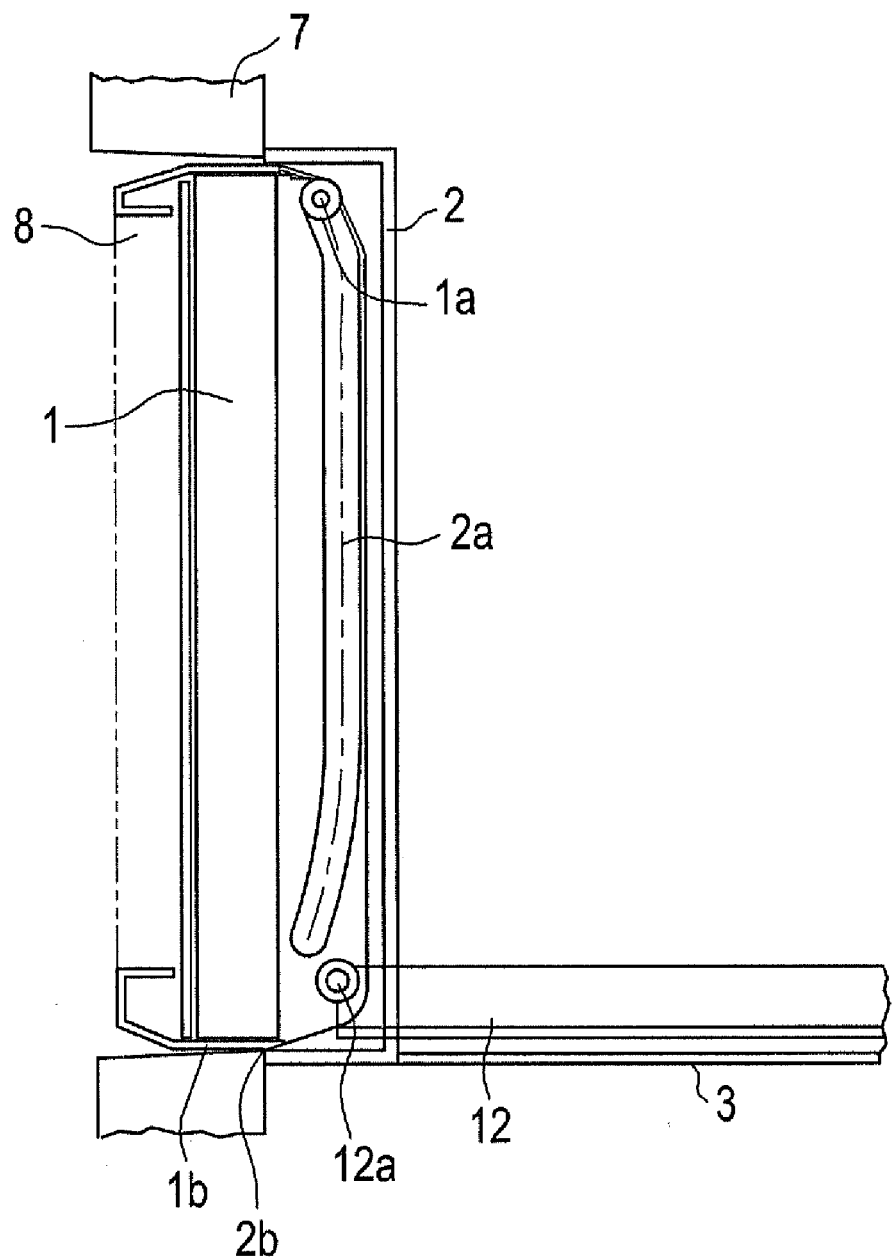
FIG. 4 is a partial side view illustrating member movement loci with seeing through some members of a conventional display panel driving mechanism for an electronic device.

Although the embodiment is constructed as described above, the invention is not limited to this, and when making the cam 6a, which restricts upward movement of the roller 5b of the arm 5, into a grooved shape which also restricts downward movement of the roller 5b, the spring which energizes the arm 5 becomes unnecessary.
Embodiment 2
FIG. 3 is a partial side view illustrating a display panel driving mechanism for an electronic device, which is a second embodiment of the present invention, with seeing through some members. In this example, subslider support shafts 4b and 4b which are installed in a standing manner in the slider 4 go through guide grooves 11b and 11b of a subslider 11, and the subslider 11 is supported movably by the slider 4.

A first shaft 11a installed in a standing manner in the subslider 11 rotatably supports the lower portion of the display panel 1. The slider 4 is driven forward integrally with the subslider 11 from a position illustrated in FIG. 3. In the position illustrated in FIG. 3, the slider 4 can drive backward the subslider 11 by a driving mechanism which is not illustrated. Other construction is the same as that in the first embodiment. The same reference numerals are assigned to members which have the same functions as those in the first embodiment, and their detailed description will be omitted.

In this example, when the subslider 11 is driven backward to the slider 4, the first shaft 11a moves upward while moving backward. Hence, it is prevented that a lower end plane of the display panel approaches the cluster panel 7, or is stacked by interfering with the cluster panel 7. In addition, a front plane of the display panel 1 can be inclined downward by such movement.

What is claimed is:

1. A vehicle-mounted electronic device comprising:
   a display panel surrounded by a cluster panel fixed to a vehicle in an initial status;
   a slider driven forward and backward on a lower side of the display panel;
   a subslider including inclined guide grooves;
   a first shaft provided in a forward side of the subslider, the first shaft supporting the lower side of the display panel to rotate the lower side of the display panel; and
   a second shaft provided on a lever attached on an upper side of the display panel, the second shaft being capable of moving along a guide groove provided on a subpanel, the guide groove extending upward and downward, and the subpanel being fixed to a case located in a backward side of the display panel,
   wherein subslider support shafts provided in the slider go through the guide grooves, and
   wherein a front plane of the display panel is inclined downward from the initial status by moving the subslider backward to the slider from the initial status and moving the first shaft backward and upward.

2. The vehicle-mounted electronic device according to claim 1, wherein the lever is a lever which is rotatably supported by the display panel, a rotation range of the lever to the display panel is restricted by a part of the lever abutting on the display panel, and a second shaft is provided in the lever.

* * * * *